United States Patent
Magro et al.

(10) Patent No.: US 8,622,044 B2
(45) Date of Patent: Jan. 7, 2014

(54) INTAKE ARRANGEMENT FOR COMBUSTION CHAMBER

(75) Inventors: Lorenzo Magro, Turin (IT); Domenico Maccarrone, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/271,933

(22) Filed: Oct. 12, 2011

(65) Prior Publication Data

US 2012/0118264 A1    May 17, 2012

(30) Foreign Application Priority Data

Oct. 12, 2010 (GB) .................................. 1017275.7

(51) Int. Cl.
*F02B 31/04* (2006.01)
*F02B 31/08* (2006.01)

(52) U.S. Cl.
USPC ........................... 123/308; 123/306; 123/432

(58) Field of Classification Search
USPC ......................................... 123/306, 308, 432
See application file for complete search history.

(56) References Cited

U.S. PATENT DOCUMENTS

| 4,760,821 | A | | 8/1988 | Aupor et al. | |
|---|---|---|---|---|---|
| 5,479,889 | A | * | 1/1996 | Sato et al. | 123/308 |
| 5,676,107 | A | * | 10/1997 | Yuzuriha et al. | 123/302 |
| 5,855,194 | A | * | 1/1999 | Okumura et al. | 123/308 |
| 6,109,234 | A | * | 8/2000 | Vallance et al. | 123/308 |
| 6,250,281 | B1 | * | 6/2001 | Takii et al. | 123/308 |
| 6,267,096 | B1 | * | 7/2001 | Vallance et al. | 123/301 |
| 6,276,330 | B1 | | 8/2001 | Adamisin et al. | |
| 6,336,438 | B1 | | 1/2002 | Durnholz et al. | |
| 7,707,989 | B2 | * | 5/2010 | Andou et al. | 123/306 |
| 7,874,278 | B2 | * | 1/2011 | Sato et al. | 123/308 |
| 7,878,172 | B2 | * | 2/2011 | Fritz et al. | 123/306 |
| 2001/0006056 | A1 | * | 7/2001 | Ichikawa | 123/308 |

FOREIGN PATENT DOCUMENTS

| AT | 1790 U1 | 11/1997 |
|---|---|---|
| DE | 1053862 B | 3/1959 |
| DE | 4205237 A1 | 8/1993 |
| DE | 19828946 A1 | 1/2000 |
| EP | 1493910 A1 | 1/2005 |
| EP | 1640567 A1 | 3/2006 |
| FR | 1200645 A | 12/1959 |

* cited by examiner

*Primary Examiner* — Erick Solis
(74) *Attorney, Agent, or Firm* — Ingrassia Fisher & Lorenz, P.C.

(57) ABSTRACT

In an intake arrangement for a combustion chamber in which a first intake duct produces a substantially rotational flow in the chamber, the flow from a second intake duct is divided into two components. The first component is an axial flow into the chamber and the second component is a rotational flow having the same sense of rotation as the first duct. The first and second components arise from the shaping of a junction region between branches of the second intake duct adjacent the chamber.

19 Claims, 5 Drawing Sheets ly to British Patent Application No. 1017275.7, filed Oct. 12, 2010, which is incorporated herein by reference in its entirety.

INTAKE ARRANGEMENT FOR COMBUSTION CHAMBER

CROSS-REFERENCE TO RELATED APPLICATION

This application claims priority to British Patent Application No. 1017275.7, filed Oct. 12, 2010, which is incorporated herein by reference in its entirety.

TECHNICAL FIELD

The technical field relates to an intake arrangement for a combustion chamber and in particular to an intake port configuration for a combustion chamber of a direct injection diesel engine.

BACKGROUND

An important aspect when designing a combustion chamber or cylinder and its associated ports is the production of an effective in-chamber motion field in the form of an axial eddy known as "swirl". An efficient design produces a high swirl to enable a quick distribution of the air or air/fuel mixture in the chamber which leads to efficient combustion.

Another design criterion is the discharge coefficient, a measure of mass flow rates from a port, or the permeability of the chamber, which represents the efficiency with which the intake ports fill the chamber with air or air/fuel mixture. This is also known as engine breathing.

In known four cylinder engines, volumetric efficiency is increased by providing two intake ports or ducts for each cylinder. The design of the ducts is different. One is configured to have a high swirl value and the other is configured to have a high level of permeability. A problem with such an arrangement is that the port with high permeability provides an opposite swirl vortex leading to a reduction in the overall swirl value. One previously proposed solution is the installation of a swirl flap adjacent to a port in order to produce the desired swirl value and thus the desired combination efficiency. However, the use of a swirl flap necessarily leads to a loss of volumetric efficiency.

Therefore, it is desirable to seek to provide an improved in-chamber motion, and provide an intake arrangement with improved volumetric efficiency. In addition, other desirable features and characteristics will become apparent from the subsequent summary and detailed description, and the appended claims, taken in conjunction with the accompanying drawings and this background.

SUMMARY

There is provided an intake arrangement for a generally cylindrical combustion chamber and comprising first and second intake ducts. The arrangement is configured so that the first duct produces a substantially rotational flow in the chamber and the second duct produces a flow having first and second components, the first component being directed substantially axially into the chamber and the second component producing a substantially rotational flow in the chamber wherein the rotational flow generated by the first duct and the second component have the same sense of rotation.

An advantage of the above-described arrangement is the combination of high volumetric efficiency with good flow distribution in the chamber. This permits an increase in the power density of engines, in particular modern diesel engines without any deterioration in low end torque. Thus high performance and fuel economy are maintained.

In an embodiment, the second duct comprises a first branch, having a first end arranged to open into the combustion chamber and a second end connected to a second branch, the second branch extending transversely of the first branch, the junction of the first and second branches being configured to have an outer part-cylindrical wall with a longitudinal axis substantially parallel to the longitudinal axis of the combustion chamber and an inner part-cylindrical wall substantially coaxial with the outer wall. An advantage of this arrangement is that an incoming longitudinal flow along the second branch passes between the outer wall and the inner wall to produce a rotational flow which passes through the first branch to produce the substantially rotational flow of the second component in the chamber.

Preferably, the inner wall extends only within a part of the height of the outer wall remote from the combustion chamber. Preferably, the inner and outer walls have cross-sections forming parts of circles. Preferably, the part-circular section of the inner wall merges into a substantially straight section which extends across the second branch. An advantage of this arrangement is that the incoming flow along the second branch impinges on the substantially straight section and becomes a flow along the first branch to produce the substantially axial flow of the first component into the chamber. Accordingly, in the first branch there is no need to provide a wall for separating the flows, thus simplifying the costing and machining processes involved in manufacturing the first branch. The height of the substantially straight section may increase away from the part-circular section of the inner wall.

In an embodiment, at parts of the inner and outer walls remote from the second branch and remote from the combustion chamber, the inner and outer walls terminate and are interconnected by an end wall extending in a substantially vertical direction, the inner, and outer and end walls forming an annular passageway. An advantage of this arrangement is that the configuration of the annular passageway can assist in directing the rotational flow through the first branch and into the chamber.

In an embodiment, a substantially cylindrical sub-chamber is formed adjacent to the combustion chamber, the sub-chamber being partly delimited by a part of the height of the outer wall adjacent to the combustion chamber. An advantage of this arrangement is that the sub-chamber provides a suitable path for the passage of the rotational and axial flows to the first branch.

Between the vertically extending end wall and the second branch, the outer wall may continue circumferentially in a radially recessed portion which also partly delimits said sub-chamber. The top of the sub-chamber may be defined by a plateau portion, the edge of which is defined by the bottom of the inner part-cylindrical wall and the top of said recessed portion of the outer cylindrical wall.

According to an embodiment there is provided an intake duct arrangement for a combustion chamber and comprising a first branch, having a first end arranged to open into the combustion chamber and a second end connected to a second branch, the second branch extending transversely of the first branch, the junction of the first and second branches being configured to have an outer part-cylindrical wall with a longitudinal axis substantially parallel to the longitudinal axis of the first branch, and an inner part-cylindrical wall substantially coaxial with the outer wall. An advantage of this arrangement is that it can produce a good flow distribution in an associated combustion chamber. Arrangements may have the same preferred features as arrangements in accordance with other arrangements and have the same, similar or other advantages.

According to an embodiment, there is provided a combination of a combustion chamber and an intake configuration therefor, the intake configuration comprising an intake arrangement as previously described for other embodiments. According to an embodiment, there is provided an automotive engine comprising the combination of a combustion chamber and an intake configuration therefor according to previously described embodiments.

The engine may be a diesel engine preferably a direct injection diesel engine.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
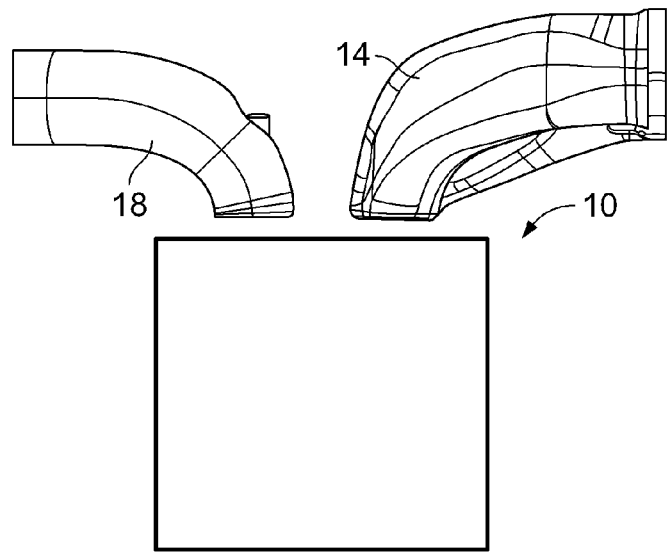
FIG. 1 is a schematic side view of a prior art combustion chamber and associated intake and exhaust ducts.
Figure 2:
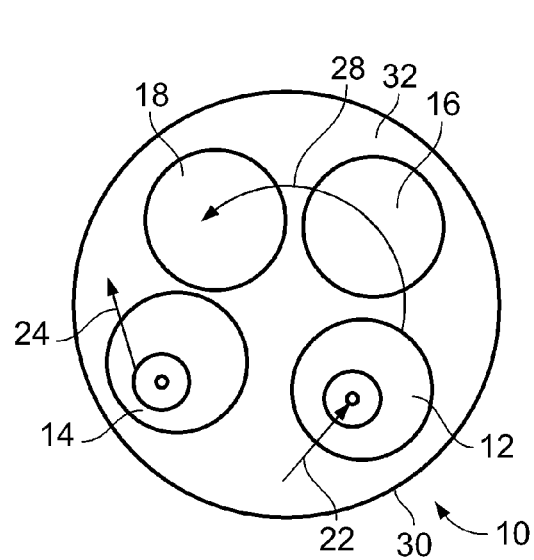
FIG. 2 is an enlarged view looking in a downwards direction from the ports into the chamber of FIG. 1.

Referring to the drawings, FIG. 1 and FIG. 2 show a prior art chamber or cylinder 10 of an internal combustion engine, in particular a direct injection diesel engine. In its top wall 32 the chamber has intake ports or ducts 12, 14 for admitting air and exhaust ports 16, 18. As generally indicated by arrow 22, the first intake port 12 generates a flow that is substantially tangential to the wall 30 of the chamber to produce a high swirl. As generally indicated by arrow 24, the second intake port 14 generates a flow which is primarily axially directed into the chamber. However, the flow has a non-negligible rotary or tangential component which generates a swirl vortex in the opposite sense of rotation to arrow 22 thus leading to an overall reduction of the value of the swirl of the chamber as indicated by arrow 28.

Figure 3:
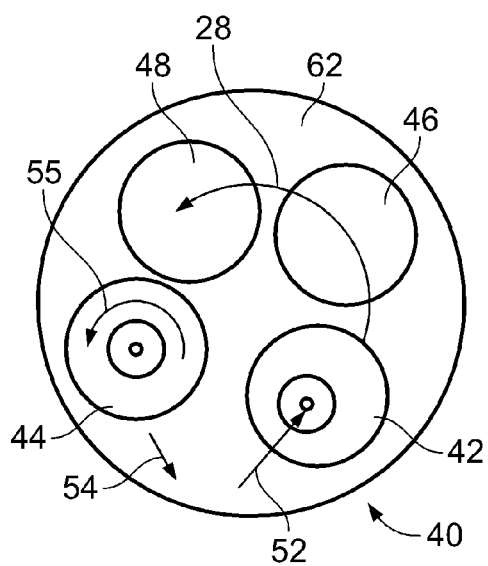
FIG. 3 is a view corresponding to FIG. 2 of a combustion chamber having an intake arrangement in accordance with an embodiment.
Figure 4:
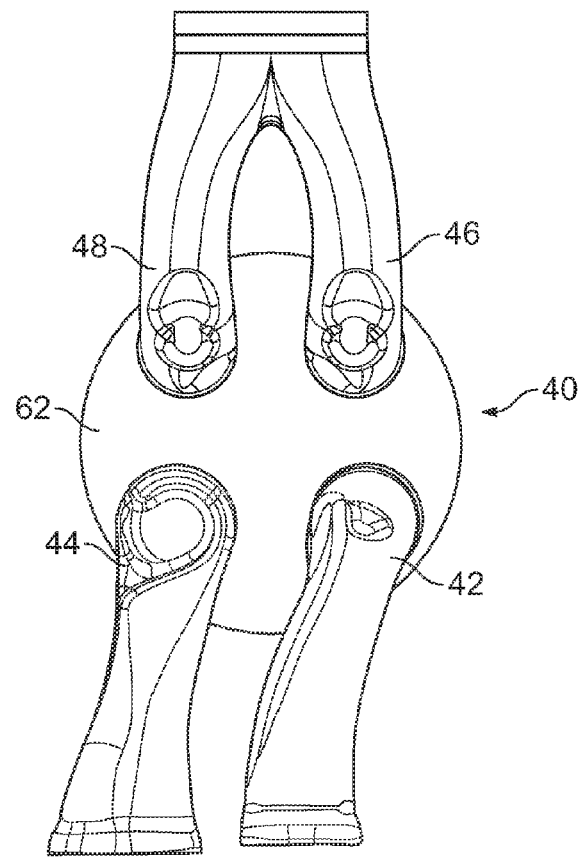
FIG. 4 is a top view of the exterior of the intake arrangement of FIG. 3.
Figure 5:
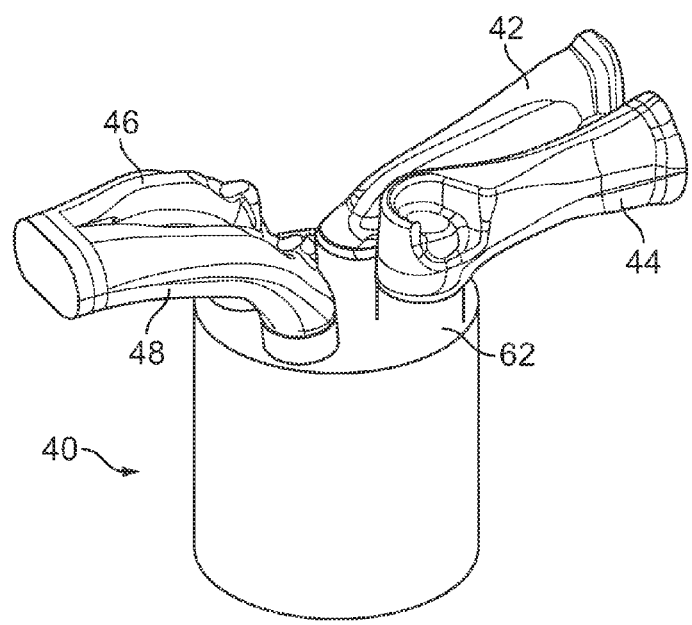
FIG. 5 is a perspective view of the arrangement of FIG. 4.

FIG. 3, FIG. 4 and FIG. 5 show a combustion chamber 40 in accordance with an embodiment. A top wall 62 of the chamber has intake ports or ducts 42, 44 and exhaust ports 46, 48. A first intake port 42 is similar to first intake port 12 of the chamber of FIG. 1 and FIG. 2 and produces a rotary flow as indicated by arrow 52.

As indicated by arrows 54 and 55, the flow of air emerging from the second intake port 44 is divided into two substantial components. Thus intake port 44 can be regarded as a hybrid duct. A first component represented by arrow 54 is directed substantially axially into the chamber 40. This achieves an efficient flow into the chamber by increasing the discharge coefficient and permeability. A second component represented by arrow 55 introduces a swirl into chamber 40 having the same sense of rotation as the first flow component 54 and thus contributing to the overall rotational motion in the chamber.

Figure 6:
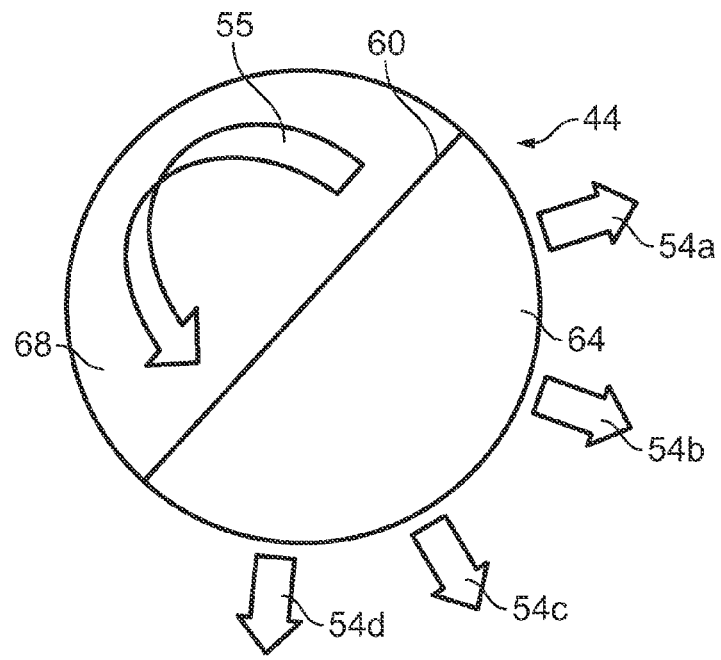
FIG. 6 is an enlarged schematic view of an intake duct of the arrangement of FIG. 3.
Figure 7:
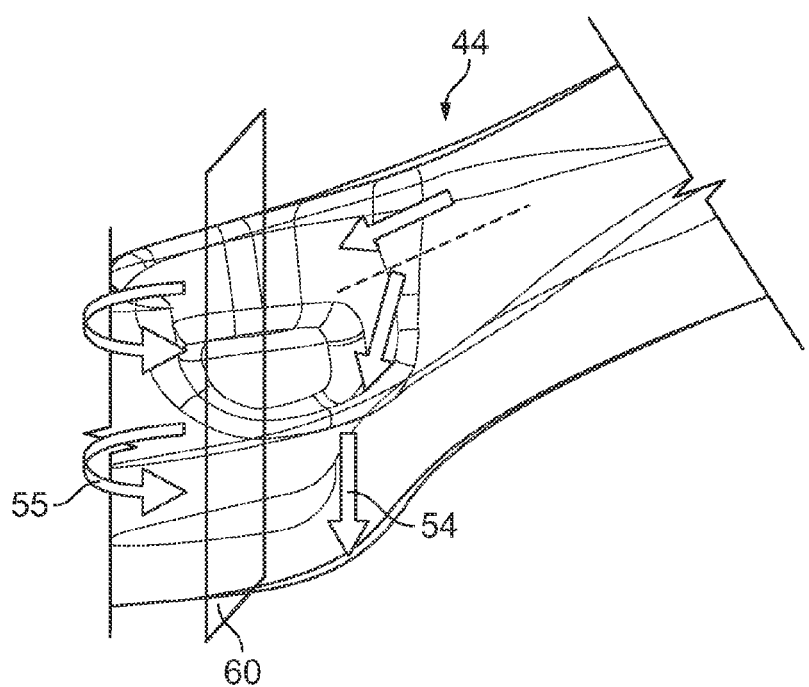
FIG. 7 is a side view of the intake duct of FIG. 6 with the duct wall removed for the purposes of clarity.

The enlarged cross-sectional and side views of intake port 44 shown in FIG. 6 and FIG. 7 illustrate that the port or duct is divided by a plane 60 into two semi-cylindrical passageways 64 and 68. It is emphasized that plane 60 is not an actual physical barrier but is a virtual plane indicating the differences between the relatively axial flows 54a to 54d from region 64 and the relatively rotational flow 55 from region 68. By suitably configuring the intake port 44, and in particular the region thereof adjacent to its mouth opening into the chamber 40, flows 54 and 55 can be simultaneously produced without a compromise between the factors of discharge coefficient and swirl generation. The two flows are generated before they pass through the valve curtain into the chamber.

Figure 8:
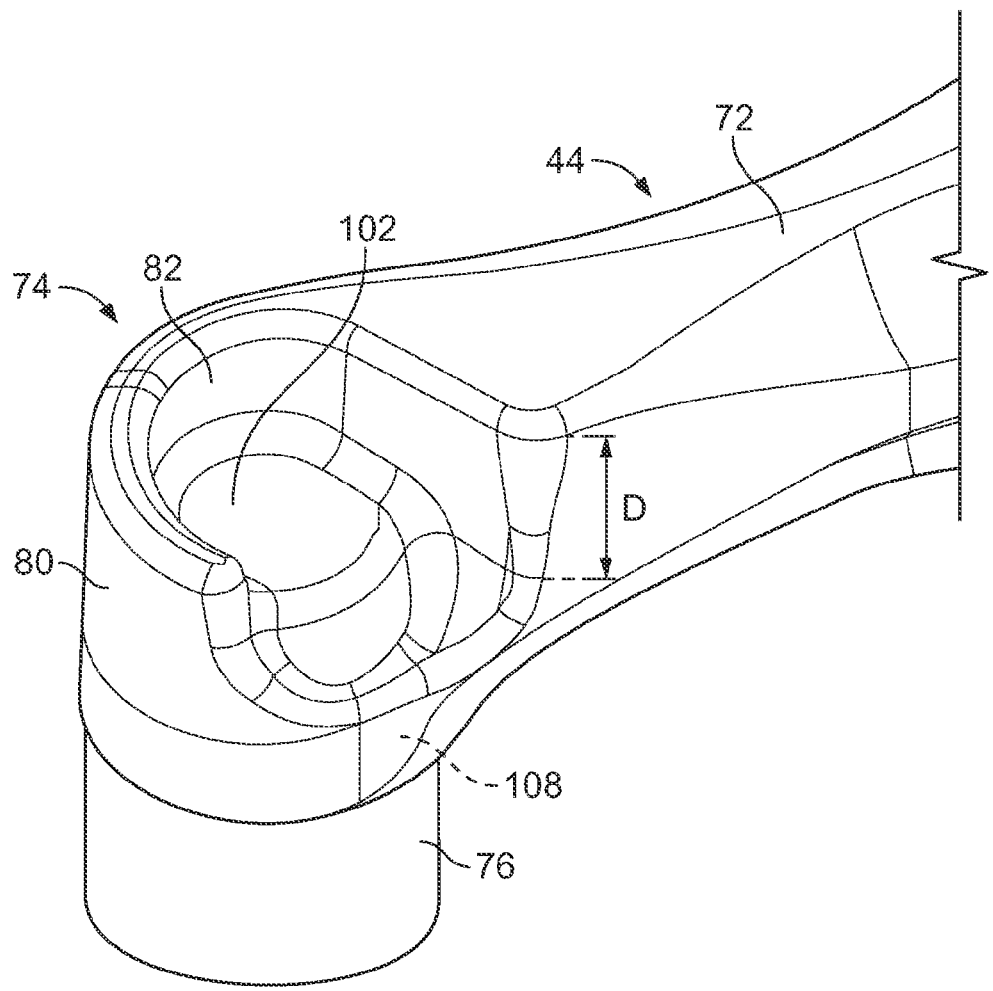
FIGS. 8, 9 and 10 are perspective views showing the configuration of the exterior of the duct of FIG. 6.
Figure 9:
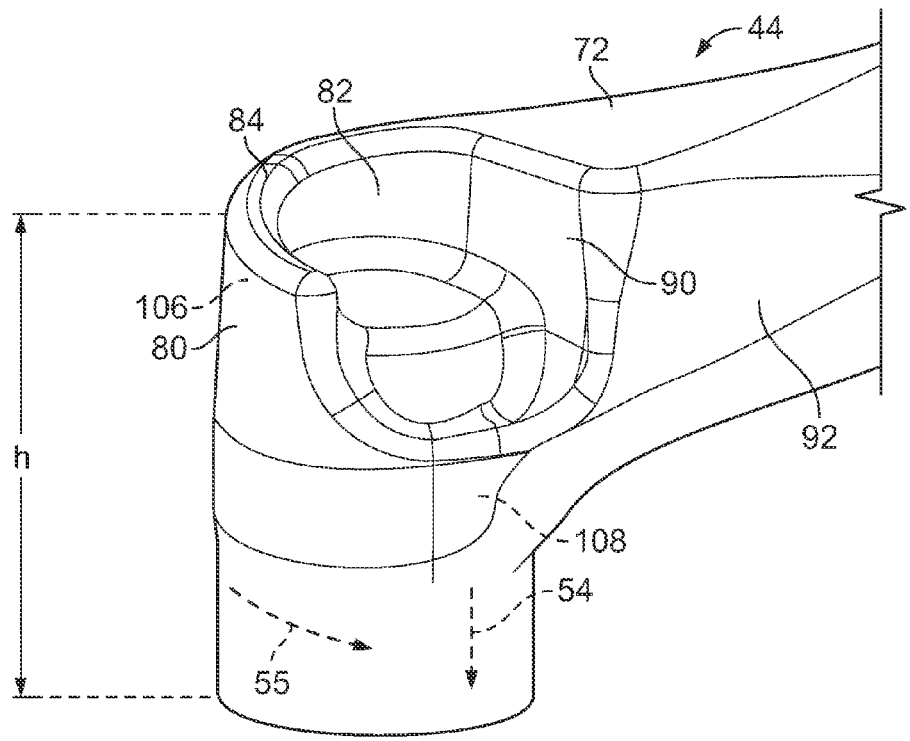
Figure 10:
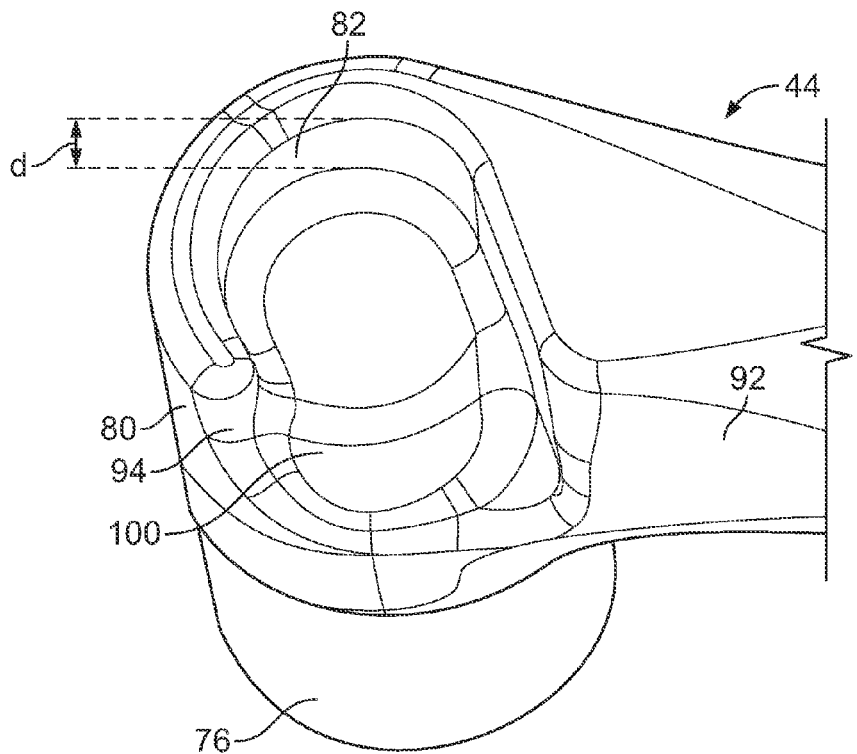

FIG. 8, FIG. 9 and FIG. 10 show perspective views of the exterior of intake duct 44 with branches or passageways 72, 76. A passageway 72, which when installed extends with a slightly downwards slope, is connected at a junction region or elbow 74 to a shorter passageway 76 arranged to open into the chamber 40. The configuration of the junction region 74 is arranged to produce the two-component flow referred to above.

Duct 44 comprises an outer, generally cylindrical wall 80. Radially-inwardly spaced from wall 80 is an inner part-cylindrical wall 82. The walls 80 and 82 are interconnected at the top by a part-circular wall 84. The walls 80, 82, 84 define between them an annular passageway 106 for generating the rotational components of flow (indicated by arrow 55) in the chamber 40.

Inner wall 82 extends vertically downwards from wall 84 by a distance "d" which is only part of the height "h" of outer cylindrical wall 80. At one end wall 82 merges into a wall portion 90 which has a height "D" where it meets wall 92 of the passageway 72 (where D>d). It is the effect of the flow within passageway 72 impinging on the interior of wall 90 and the adjoining part of the wall 82 which generates the axial or vertical component of flow (indicated by arrow 54) in chamber 40.

The part-circular chamber formed inside walls 80, 82 and 84 terminates in a substantially vertical wall portion 94. Thus it will be seen that there is a circumferential gap between walls 92 and 94 towards the front of the duct, i.e., in the direction of the viewer in FIG. 8 to FIG. 10. Through the gap can be seen a part-cylindrical wall 100, slightly recessed compared to wall 80 and a plateau region 102 which forms the top of a generally cylindrical sub-chamber 108 within the duct. The sub-chamber 108 is formed by walls 80, 100. The edge of plateau region 102 is formed at the rear by the bottom edge of wall 82 and at the front by the top edge of wall 100. It is through sub-chamber 108 that the rotational and axial flows 55 and 54 are transferred to the chamber 40.

An advantage of the above-described embodiment is the combination of high volumetric efficiency with good air distribution in the chamber. This permits an increase in the power density of engines, in particular modern diesel engines without any deterioration in low end torque. Thus high performance and fuel economy are maintained. The configuration of the intake port 44 without the need for a separating wall in the plane 60 simplifies the casting and machining processes. However, if desired an actual wall may be provided in a modification. The relative shapes and sizes of the walls and duct portions 80, 82, 84, 92, 94, 100 and 102 are shown as an example and can be varied as desired. For direct-injection diesel engines, only air passes through the intake ports. The intake arrangement can also be employed in other engines, in which an air/fuel mixture passes through the ports.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An intake arrangement for a combustion chamber, comprising:
   a first intake duct configured to produce a first substantially rotational flow in the combustion chamber; and
   a second intake duct configured to produce a flow having a first component and a second component, the second intake duct comprising:
      a first branch having a first end that is arranged to open into the combustion chamber;
      a second end connected to a second branch, the second branch extending transversely of the first branch, and
      a junction of the first branch and the second branch that has an outer part-cylindrical wall with a first longitudinal axis substantially parallel to a second longitudinal axis of the combustion chamber and an inner part-cylindrical wall substantially coaxial with the outer part-cylindrical wall,
   wherein the first component is directed axially into the combustion chamber, and
   wherein the second component represents a second substantially rotational flow in the combustion chamber and the first substantially rotational flow and the second component have a same sense of rotation.

2. The intake arrangement according to claim 1, wherein the inner part-cylindrical wall extends only within a part of a height of the outer part-cylindrical wall remote from the combustion chamber.

3. The intake arrangement according to claim 1, wherein the inner part-cylindrical wall and the outer part-cylindrical wall has cross-sections forming parts of circles.

4. The intake arrangement according to claim 2, wherein the inner part-cylindrical wall merges into a substantially straight section that extends across the second branch.

5. The intake arrangement according to claim 4, wherein the height of the substantially straight section increases away from a part-circular section of the inner part-cylindrical wall.

6. The intake arrangement according to claim 2, wherein parts of the inner part-cylindrical wall and the outer part-cylindrical wall that are remote from the second branch and remote from the combustion chamber terminate and interconnect by an end wall extending in a substantially vertical direction, the inner part-cylindrical wall, the outer part-cylindrical wall, and the end wall forming an annular passageway.

7. The intake arrangement according to claim 6, wherein a substantially cylindrical sub-chamber is formed adjacent to the combustion chamber, said substantially cylindrical sub-chamber partly delimited by the part of the height of the outer part-cylindrical wall adjacent to the combustion chamber.

8. The intake arrangement according to claim 7, wherein between the end wall and the second branch, the outer part-cylindrical wall continues circumferentially in a radially recessed portion that also partly delimits said substantially cylindrical sub-chamber.

9. The intake arrangement according to claim 7, wherein the top of the substantially cylindrical sub-chamber is defined by a plateau portion, an edge of the plateau portion defined by the bottom of the inner part-cylindrical wall and the top of a recessed portion of the outer part-cylindrical wall.

10. An intake duct arrangement for a combustion chamber, comprising:
    a first branch having a first end arranged to open into the combustion chamber;
    a second end connected to a second branch, the second branch extending transversely of the first branch; and
    a junction that connects the first branch and the second branch having an outer part-cylindrical wall with a longitudinal axis substantially parallel to the longitudinal axis of the first branch and an inner part-cylindrical wall substantially coaxial with the outer part-cylindrical wall,
    wherein the junction of the first branch and the second branch produces a flow having a vertical component and a rotational component.

11. The intake duct arrangement according to claim 10, further comprising:
    a third branch having a third end that is arranged to open into the combustion chamber;
    a fourth end connected to a fourth branch, the fourth branch extending transversely of the first branch, and
    a second junction of the second branch and the third branch that has an second outer part-cylindrical wall with a first longitudinal axis substantially parallel to a second longitudinal axis of the combustion chamber and the inner part-cylindrical wall substantially coaxial with the outer part-cylindrical wall.

12. The intake duct arrangement according to claim 11, wherein the inner part-cylindrical wall extends only within a part of a height of the outer part-cylindrical wall remote from the combustion chamber.

13. The intake duct arrangement according to claim 11, wherein the inner part-cylindrical wall and the outer part-cylindrical wall has cross-sections forming parts of circles.

14. The intake duct arrangement according to claim 12, wherein the inner part-cylindrical wall merges into a substantially straight section that extends across the second branch.

15. The intake duct arrangement according to claim 14, wherein the height of the substantially straight section increases away from a part-circular section of the inner part-cylindrical wall.

16. The intake duct arrangement according to claim 12, wherein parts of the inner part-cylindrical wall and the outer part-cylindrical wall remote from the second branch and remote from the combustion chamber terminate and are interconnected by an end wall extending in a substantially vertical direction, the inner part-cylindrical wall, the outer part-cylindrical wall, and the end wall forming an annular passageway.

17. The intake duct arrangement according to claim 16, wherein a substantially cylindrical sub-chamber is formed adjacent to the combustion chamber, said substantially cylindrical sub-chamber partly delimited by the part of the height of the outer part-cylindrical wall adjacent to the combustion chamber.

18. The intake duct arrangement according to claim 17, wherein between the end wall and the second branch, the outer part-cylindrical wall continues circumferentially in a radially recessed portion that also partly delimits said substantially cylindrical sub-chamber.

19. The intake duct arrangement according to claim 17, wherein the top of the substantially cylindrical sub-chamber is defined by a plateau portion, an edge of the plateau portion defined by the bottom of the inner part-cylindrical wall and the top of a recessed portion of the outer part-cylindrical wall.

* * * * *